United States Patent [19]

Wagner et al.

[11] Patent Number: 5,022,631
[45] Date of Patent: Jun. 11, 1991

[54] FLOW-CONTROL AND SHUTOFFF VALVE

[75] Inventors: Friedrich Wagner, Endingen; Walter Grau, Mahlberg, both of Fed. Rep. of Germany

[73] Assignee: Friedrich Grohe Armaturenfabrik GmbH & Co., Hemer, Fed. Rep. of Germany

[21] Appl. No.: 599,707

[22] Filed: Oct. 18, 1990

[30] Foreign Application Priority Data

Oct. 20, 1989 [DE] Fed. Rep. of Germany ....... 3934976

[51] Int. Cl.$^5$ .............................................. F16K 3/02
[52] U.S. Cl. ..................................... 251/185; 251/304
[58] Field of Search ...................... 251/180, 185, 304; 137/454.5, 454.6

[56] References Cited

U.S. PATENT DOCUMENTS 2,851,244 9/1958 Monson ........................... 251/185 X
2,935,293 5/1960 Monsom .......................... 251/185 X
4,889,157 12/1989 Bergmann ....................... 137/454.5

FOREIGN PATENT DOCUMENTS 3107431 9/1982 Fed. Rep. of Germany .

Primary Examiner—John C. Fox
Attorney, Agent, or Firm—Herbert Dubno; Andrew Wilford

[57] ABSTRACT

A valve has a housing forming a compartment traversed by an axis and having a radially opening outlet port and an axially open inlet port, a valve plate fixed in the housing and formed relative to the flow direction with a flat upstream face and with an axially throughgoing valve orifice opening at the face, and a control plate in the housing formed relative to a flow direction through the valve with a flat downstream face riding on the valve-plate face, an axially throughgoing control orifice opening at the face, and an axially open and radially elongated socket on the face adjacent the respective orifice. The control plate is pivotal on the valve plate about the axis for alignment of the orifices and flow through the valve from the inlet port to the outlet port and for misalignment of the orifices for restricted flow from the inlet port to the outlet port. A valve stem rotatable in the housing about the axis projects through the valve-plate orifice and is formed with a foot projecting radially from the axis, fitting in the socket, and rotationally coupling the stem and the control plate.

12 Claims, 3 Drawing Sheets

FLOW-CONTROL AND SHUTOFF VALVE

FIELD OF THE INVENTION

The present invention relates to a valve. More particularly this invention concerns a flow-control and shutoff valve of the type mounted in a faucet or like fixture.

BACKGROUND OF THE INVENTION

A standard flow-control and shutoff valve of the type described in German patent document 3,107,431 of W. Orszullok or in commonly owned U.S. patent application Ser. No. 07/580,939 filed 10 Sept. 1990 has a housing forming a compartment traversed by an axis and having a radially opening outlet port and an axially open inlet port. Fluid can flow through the compartment in a flow direction from the inlet port to the outlet port in the open condition of the valve. A valve plate fixed in the housing is formed relative to the flow direction with a flat upstream face and with an axially throughgoing valve orifice opening at the face and a control plate rotatable in the housing about the axis is formed relative to the flow direction with a flat downstream face riding on the valve-plate face, with an axially throughgoing control orifice opening at the face. This control plate is pivotal on the valve plate about the axis for alignment of the orifices and flow through the valve from the inlet port to the outlet port and for misalignment of the orifices for restricted flow from the inlet port to the outlet port. A combined spring and seal fitted into the inlet port typically press the downstream face of the control plate against the upstream face of the valve plate. The control plate is operated by a valve stem rotatable in the housing about the axis and formed at its inner end with a noncircular projection passing through the control plate and fitting in a complementary recess formed on the downstream face of the control plate.

As a rule, the housing is externally threaded, typically with a ½ inch standard pipe thread, so that it can be screwed directly into a complementarily threaded hole in a fixture such as a faucet that incorporates the valve. The stem itself must be of large enough diameter that a handle or knob can be mounted on it. Thus little room is left in the housing for flow from the inlet port to the outlet port. It is therefore necessary for the user to make the coupling projection of the valve stem as small as possible in order to minimize the size of the hole in the valve plate and the room it takes up in the flow chamber. The tradeoff is therefore between strength and flow cross section, so that it is rarely possible to achieve a high-volume flow with a valve engineered for a long service life.

OBJECTS OF THE INVENTION

It is therefore an object of the present invention to provide an improved flow-control and cutoff valve.

Another object is the provision of such an improved flow-control and cutoff valve which overcomes the above-given disadvantages, that is which can be used as a valve insert but where there is no loss in strength in the valve stem or in flow capacity.

SUMMARY OF THE INVENTION

A valve according to this invention has a housing forming a compartment traversed by an axis and having a radially opening outlet port and an axially open inlet port so that fluid can flow through the compartment in a flow direction from the inlet port to the outlet port, a valve plate fixed in the housing and formed relative to the flow direction with a flat upstream face and with an axially throughgoing valve orifice opening at the face, and a control plate in the housing formed relative to the flow direction with a flat downstream face riding on the valve-plate face, an axially throughgoing control orifice opening at the face, and with an axially open and radially elongated socket on the face adjacent the respective orifice. The control plate is pivotal on the valve plate about the axis for alignment of the orifices and flow through the valve from the inlet port to the outlet port and for misalignment of the orifices for restricted flow from the inlet port to the outlet port. According to the invention a valve stem rotatable in the housing about the axis projects through the valve-plate orifice and is formed with a foot projecting radially from the axis, fitting in the socket, and rotationally coupling the stem and the control plate.

Thus the stem is solidly rotationally coupled to the control plate. In addition the foot holds the valve plate in place and allows the valve to be assembled and taken apart fairly easily.

In accordance with another feature of this invention a spring engaged axially against the control plate presses same axially against the valve plate and a seal in the inlet port in turn holds the spring in place. Furthermore the foot is unitary with the stem and interengaging abutments on the stem and on the housing limit rotation of the stem about the axis in the housing to substantially less than 360°.

According to a further feature of this invention a spring plate fixed against rotation in the housing engages an upstream face of the control plate and formed with an orifice aligned with the orifice of the valve plate. This spring-plate orifice is of generally the same size and shape as the valve-plate orifice and is formed with a finger bearing axially generally centrally on the upstream face of the control plate and with an outer rim engaged in the housing and from which the finger extends. The housing is formed with at least one axially extending groove and the spring plate is formed with at least one radially projecting tab engaging in the groove and rotationally locking the spring plate in the housing.

To reduce play in the valve an elastomeric material in the socket around the foot. This can be done most simply by providing the foot with an elastomeric cladding. In addition the spindle has an axially inner end projection of predetermined diameter from which the foot extends and the foot has a radial length equal to about 2.5 times the diameter. The diameter is about 3 mm and the length is about 10 mm. Furthermore the valve-plate orifice has a main lobe of generally semicircular shape with a straight edge extending generally through the axis and a minor lobe at the axis through which the stem projects and generally centered on the straight edge.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one FIGURE but identical to those of another refer to structure that is functionally if not structurally identical. In the accompanying drawing.

SPECIFIC DESCRIPTION

Figure 1:
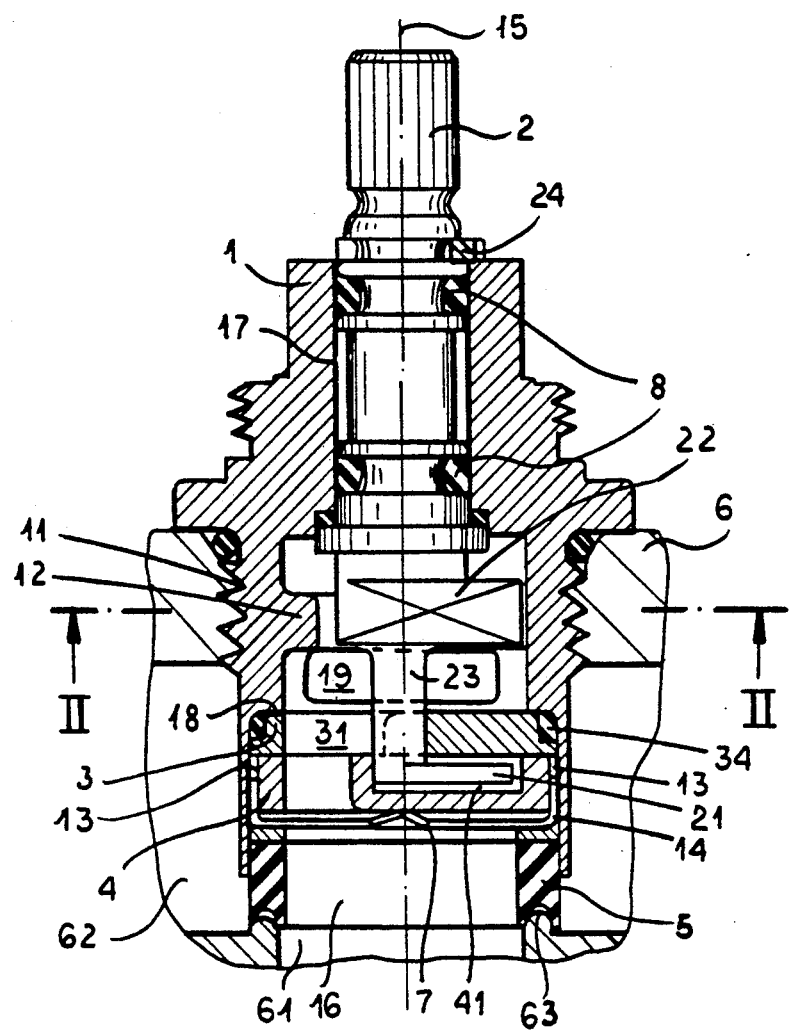
FIG. 1 is an axial section through a valve according to this invention.
Figure 3:
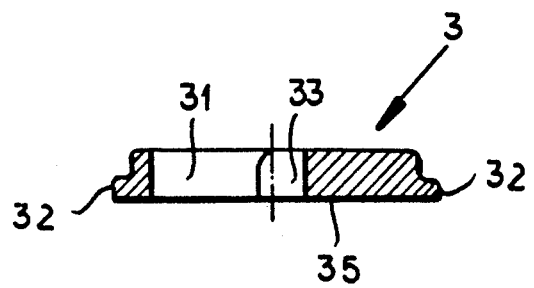
FIG. 3 is an axial section through the valve plate of the FIG. 1 valve.
Figure 4:
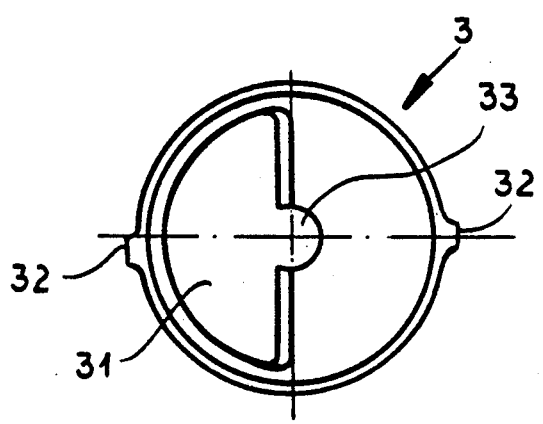
FIG. 4 is a top view of the FIG. 3 valve plate.

As seen in FIG. 1 a valve insert according to this invention has a housing 1 centered on an axis 15 and formed with a ¾ in screwthread 11 by means of which it is secured in a fixture 6, with an axially inwardly opening inlet port 16, and a radially outwardly open outlet port 19. The fixture itself has a feed port 61 with a raised edge 63 aligned with the port 16 and an outfeed compartment 62 into which the port 19 opens. Supported on an axially inwardly directed shoulder 18 in this housing 1 is a valve plate 3 formed with a throughgoing semicircular orifice 31. The plate 3 has edge tabs 32 fitted in axial grooves 13 in the housing 1 so that it cannot rotate therein about the axis 15. As seen in FIGS. 3 and 4 the semicircular orifice 31 of the plate 3 has a straight edge extending along a diameter through the axis 15 and itself centrally formed with a minor lobe 33 centered on the axis 15. A seal 32 is provided between the outer rim of the plate 3 and the shoulder 18 of the housing 1.

Figure 5:
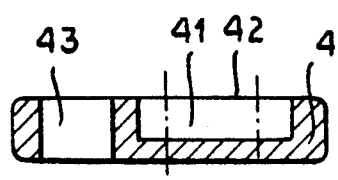
FIG. 5 is an axial section through the control plate of the valve.
Figure 6:
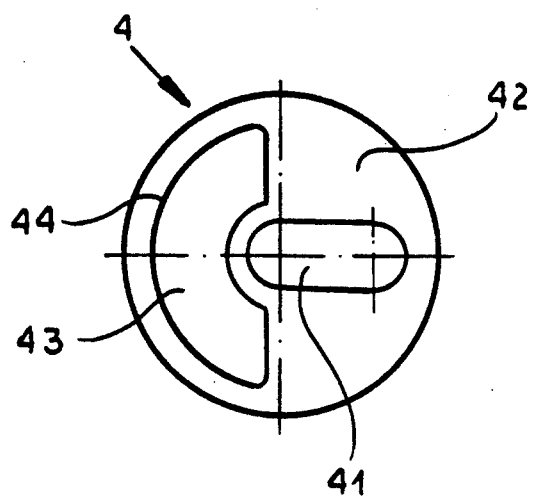
FIG. 6 is a top view of the FIG. 5 control plate.

A generally circular control plate 4 formed with an axially throughgoing orifice 43 like the orifice 31 rests flatly with its upstream face 42 (relative to a flow direction D) on the downstream face of the plate 3 but can rotate thereon about the axis 15 to align or misalign the orifices 31 and 43 and thereby control flow through the valve. As seen in FIGS. 5 and 6 the orifice 43 has a straight side which is formed with an inwardly projecting bump opposite to the cutout 33 of the plate 3. In addition a downstream face 42 of this plate is formed with a radially elongated pocket 41 forming a socket and having an inner end centered on the axis 15.

Figure 10:
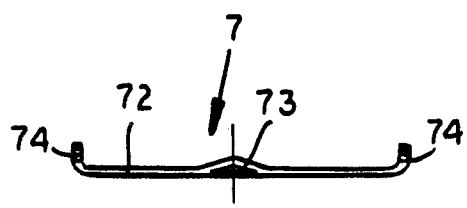
FIG. 10 is an axial section through the spring of the valve.
Figure 11:
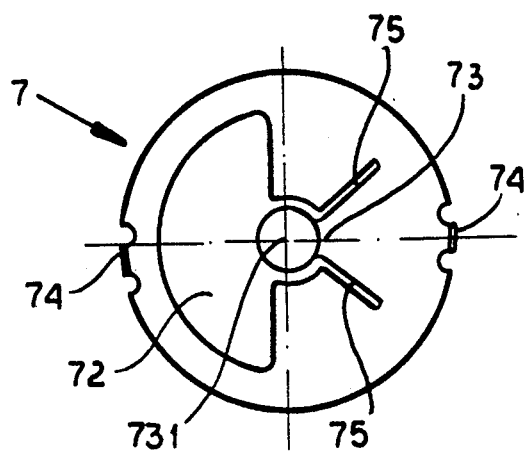
FIG. 11 is a top view of the FIG. 10 spring.

A spring plate 7 bears axially centrally on the upstream face of the plate 4 and is formed with a semicircular orifice 72 of generally the same shape and size as the orifice 31 and aligned axially therewith. In addition this plate 7 has turned-up rim tabs 74 that engage in the grooves 13 to rotationally fix this spring 7 in the housing 1. An elastomeric seal ring 5 fits against the downstream face of the spring 7 and projects slightly out of the inlet port 16 so that when installed this seal 5 is compressed and holds the plates 3, 4, and 7 axially together. As better shown in FIGS. 10 and 11 the spring 7 is formed with two radially extending slots 75 defining a spring tongue 73 having a tip 731 that bears centrally upward on the plate 4, holding its face 42 flat against the downstream face 35 of the disk 3.

Figure 2:
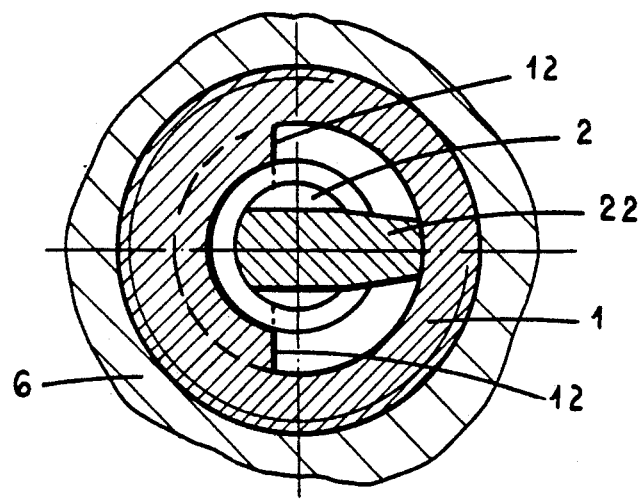
FIG. 2 is a section taken along line II—II of FIG. 1.
Figure 8:
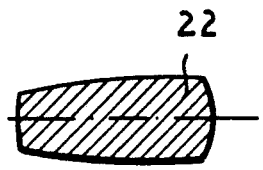
FIGS. 8 and 9 are sections taken along respective lines VIII—VIII and IX—IX of FIG. 7.
Figure 9:
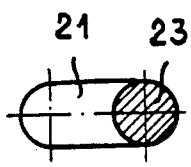
Figure 7:
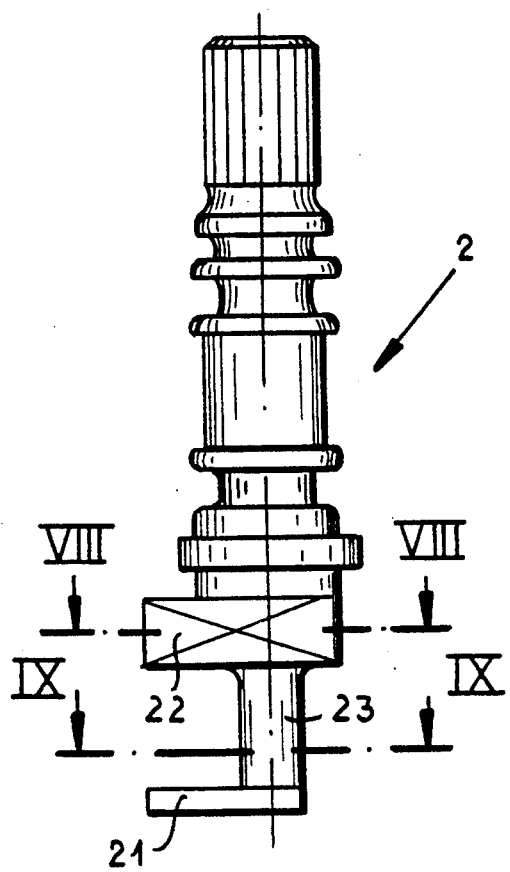
FIG. 7 is a side view of the valve stem of the valve.

In accordance with this invention a pressed-brass stem 2 centered on the axis 15 is fitted to the outer part of the housing 1. As also shown in FIGS. 7 through 9 this stem 2 has a radially projecting abutment 22 that can engage abutments 12 (FIG. 2) formed in the housing 1 to limit the rotation of the stem 2 in the housing 1 to about 180°. The stem 2 is held axially in place by a snap ring 24 and is sealed by O-rings 8 in housing 1. At its inner end it has a cylindrical extension 23 formed at its end with a radially projecting foot 21 provided with an elastomeric cladding and shaped to fit snugly in the socket 41. The projection 23 is cylindrical, centered on the axis 15, and of a diameter of 3 mm and the foot 21 has a radial length of 10 mm. Thus the foot 21 rotationally couples the stem 2 to the plate 4 and the projection passes through the complementarily shaped cutout 33 of the orifice 31.

Such a valve is assembled by fitted together by hooking the foot 21 through the orifice 31 and fitting the projection 23 to the cutout 33, and then pushing the thus assembled parts into the housing 1 from the inlet port 6. Once in place the snap ring 24 is installed and the stem 2 then holds the valve plate 3 in place. Then the control plate 4 is installed with its socket 41 fitting over the foot 21, and the spring plate 7 is pushed in, seating it against a shallow shoulder 14 formed win the port 16 with the tabs 74 in the grooves 13. Finally the seal ring 5 is pressed into place and the completed assembly is screwed into the fixture 6, hereby compressing the seal 5 against the ridge 63.

We claim:

1. A valve comprising:
   a housing forming a compartment traversed by an axis and having a radially opening outlet port and an axially open inlet port, whereby fluid can flow through the compartment in a flow direction from the inlet port to the outlet port;
   a valve plate fixed in the housing and formed relative to the flow direction with a flat upstream face and with an axially throughgoing valve orifice opening at the face;
   a control plate in the housing formed relative to the flow direction with a flat downstream face riding on the valve-plate face, an axially throughgoing control orifice opening at the face, and with an axially open and radially elongated socket on the face adjacent the respective orifice, the control plate being pivotal on the valve plate about the axis for alignment of the orifices and flow through the valve from the inlet port to the outlet port and for misalignment of the orifices for restricted flow from the inlet port to the outlet port; and
   a valve stem rotatable in the housing about the axis, projecting through the valve-plate orifice, and formed with a foot projecting radially from the axis, fitting in the socket, and rotationally coupling the stem and the control plate.

2. The valve defined in claim 1, further comprising a spring engaged axially against the control plate and pressing same axially against the valve plate; and a seal in the inlet port.

3. The valve defined in claim 1 wherein the foot is unitary with the stem.

4. The valve defined in claim 1, further comprising interengaging abutments on the stem and on the housing limiting rotation of the stem about the axis in the housing to substantially less than 360°.

5. The valve defined in claim 1, further comprising a spring plate fixed against rotation in the housing and engaging an upstream face of the control plate and formed with an orifice aligned with the orifice of the valve plate.

6. The valve defined in claim 5 wherein the spring-plate orifice is of generally the same size and shape as the valve-plate orifice.

7. The valve defined in claim 5 wherein the spring plate is formed with a finger bearing axially generally centrally on the upstream face of the control plate and with an outer rim engaged in the housing and from which the finger extends.

8. The valve defined in claim 5 wherein the housing is formed with at least one axially extending groove and the spring plate is formed with at least one radially projecting tab engaging in the groove and rotationally locking the spring plate in the housing.

9. The valve defined in claim 1, further comprising an elastomeric material in the socket around the foot.

10. The valve defined in claim 1 wherein the spindle has an axially inner end projection of predetermined diameter from which the foot extends, the foot having a radial length equal to about 2.5 times the diameter.

11. The valve defined in claim 10 wherein the diameter is about 3 mm and the length is about 10 mm.

12. The valve defined in claim 1 wherein the valve-plate orifice has a main lobe of generally semicircular shape with a straight edge extending generally through the axis and a minor lobe at the axis through which the stem projects and generally centered on the straight edge.

* * * * *